(12) United States Patent
Uetsuji et al.

(10) Patent No.: US 7,767,105 B2
(45) Date of Patent: Aug. 3, 2010

(54) METHOD OF FIXING A STATOR CORE AND AN ELECTRIC COMPRESSOR

(75) Inventors: Kiyoshi Uetsuji, Kariya (JP); Hiroshi Fukasaku, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 141 days.

(21) Appl. No.: 12/259,230

(22) Filed: Oct. 27, 2008

(65) Prior Publication Data

US 2009/0108697 A1 Apr. 30, 2009

(30) Foreign Application Priority Data

Oct. 29, 2007 (JP) .............................. 2007-280651

(51) Int. Cl.
*H02K 1/00* (2006.01)
(52) U.S. Cl. ............................................. 216/58; 216/4
(58) Field of Classification Search ................... 29/596; 310/216.001–216.137, 89
See application file for complete search history.

(56) References Cited

U.S. PATENT DOCUMENTS 7,164,218 B2 * 1/2007 Kimura et al. ......... 310/216.044

7,466,055 B2 12/2008 Toide et al.
2005/0115055 A1 * 6/2005 Kimura et al. ................ 29/596

FOREIGN PATENT DOCUMENTS

| JP | 10-024333 A | 1/1998 |
| JP | 2002-281698 A | 9/2002 |
| JP | 2005-304150 A | 10/2005 |
| JP | 2006-299834 A | 11/2006 |

* cited by examiner

*Primary Examiner*—Nguyen N Hanh
(74) *Attorney, Agent, or Firm*—Knoble Yoshida & Dunleavy, LLC (57) ABSTRACT

A method of fixing a stator core in a cylindrical housing includes the following steps. The first step is a step of blanking a plurality of stator core sheets from an electromagnetic steel sheet by using a die. The die has a circular outside contour for blanking the stator core sheets from the electromagnetic steel sheet and each of the blanked stator core sheets has an outside contour. The second step is a step of forming the stator core by laminating the blanked stator core sheets one on another. The third step is a step of setting a non-fixing position of the stator core to the housing in such an angular position where difference in diametral dimension of the outside contour between the die and the stator core is relatively large.

10 Claims, 9 Drawing Sheets

FIG. 1

ROLLING DIRECTION
OF STEEL SHEET

METHOD OF FIXING A STATOR CORE AND AN ELECTRIC COMPRESSOR

BACKGROUND OF THE INVENTION

The present invention relates to a method of fixing a stator core and an electric compressor with a motor using the method.

Figure 6:
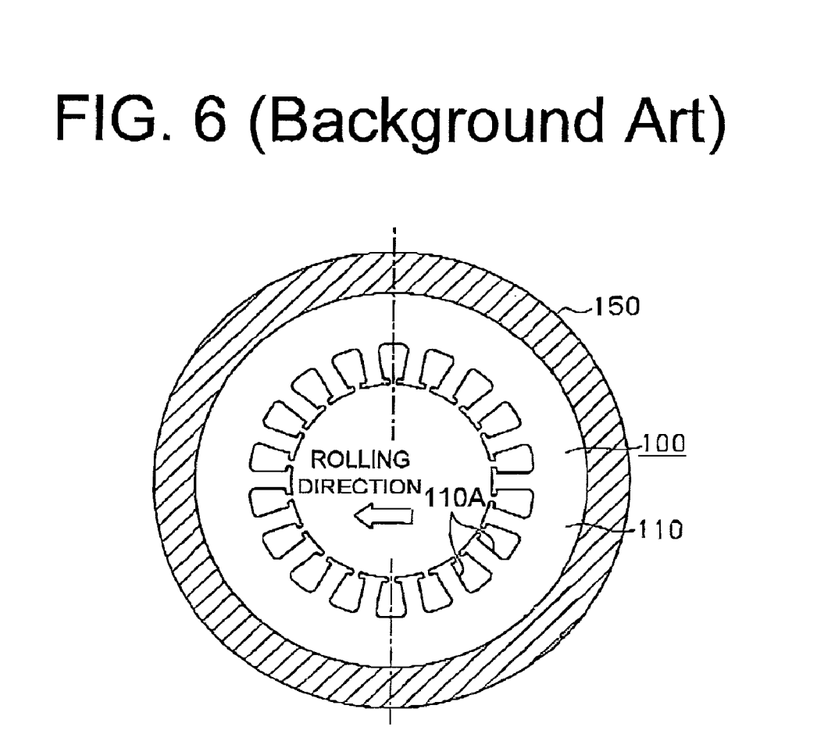
FIG. 6 is a schematic cross sectional view showing a stator fixed to a housing according to background art.

Referring to FIG. 6, a stator 100 of a motor is shown which is fixed inside a cylindrical housing 150. A stator core 110 of the stator 100 is formed of a plurality of stator core sheets 111 laminated together into a stack (refer to FIG. 7). It is noted that stator windings are not shown in FIG. 6.

Figure 7:
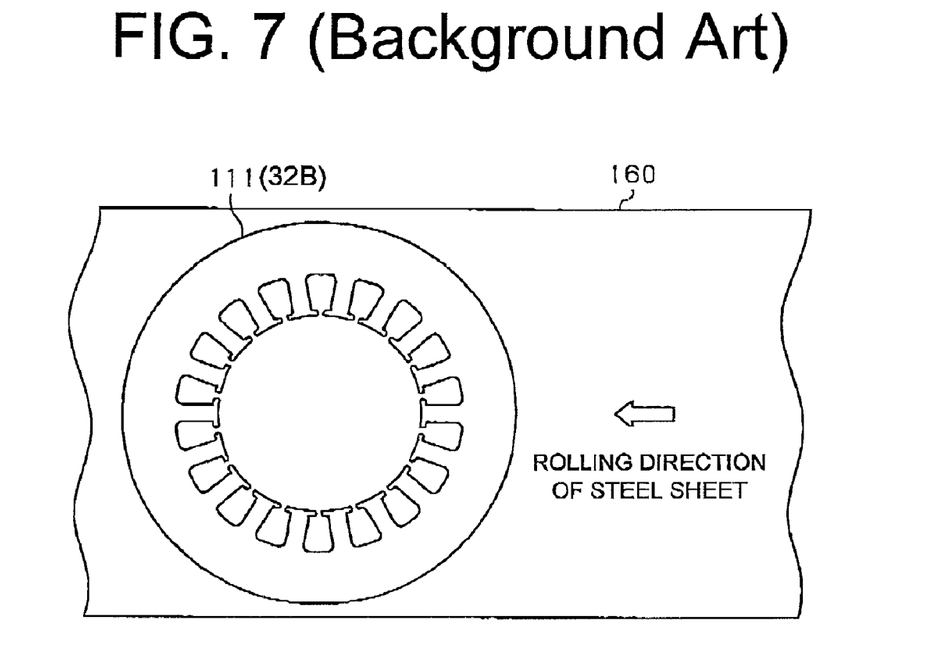
FIG. 7 is a plan view showing a stator core sheet and an electromagnetic steel sheet from which the stator core sheet is blanked off.

Referring to FIG. 7 showing a process of making a stator core sheet 111, a common electromagnetic steel sheet 160 is rolled to a predetermined thickness. Each of the stator core sheets 111 is blanked off from the steel sheet 160 by using a die. A predetermined number of the stator core sheets 111 are laminated to form the stator core 110.

Figure 8:
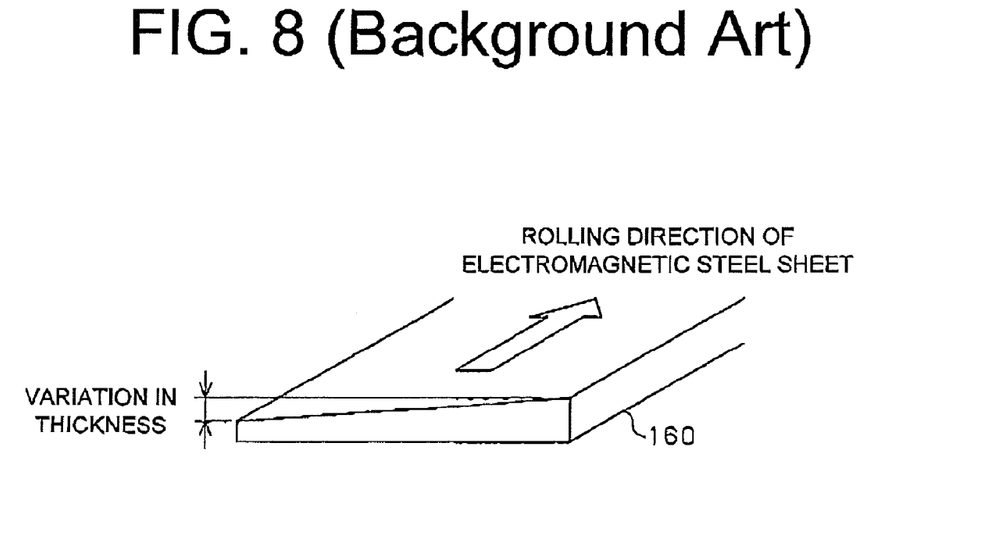
FIG. 8 is a perspective view showing a variation in the thickness of the electromagnetic steel sheet.

Referring to FIG. 8, there exists a variation in the thickness of the steel sheet 160 in the direction perpendicular to a rolling direction of the steel sheet 160. In making the stator core 110 which requires perpendicularity, the blanked stator core sheets 111 are turned and laminated one on another so that the perpendicularity is accomplished.

Referring back to FIG. 6, the stator core 110 has on the inner circumferential surface thereof a plurality of teeth 110A, around each of which a copper wire (not shown) is wound thereby to form the stator 100 of the motor. The copper wires are insulated from the teeth 110A. The stator 100 is fixed inside the housing 150 by any suitable method such as shrink fit. As shown in FIG. 6, the stator 100 is fixed over the entire circumference by the housing 150.

Japanese Patent Application Publication No. 10-24333 discloses a method of manufacturing a stator core sheet whose axial contour is circular or a true circle. Specifically, a blanking die is controlled such that a stator core sheet having a true circle is made by correcting an elliptical shape of the stator core sheet elongated in the direction perpendicular to the rolling direction of electromagnetic steel sheet and contracted in the rolling direction. Japanese Patent Application Publication No. 2006-299834 discloses an electric compressor having a housing whose inner circumferential surface is formed with a plurality of projections by which the stator of an electric motor for the compressor is fixed to the housing.

Figure 9:
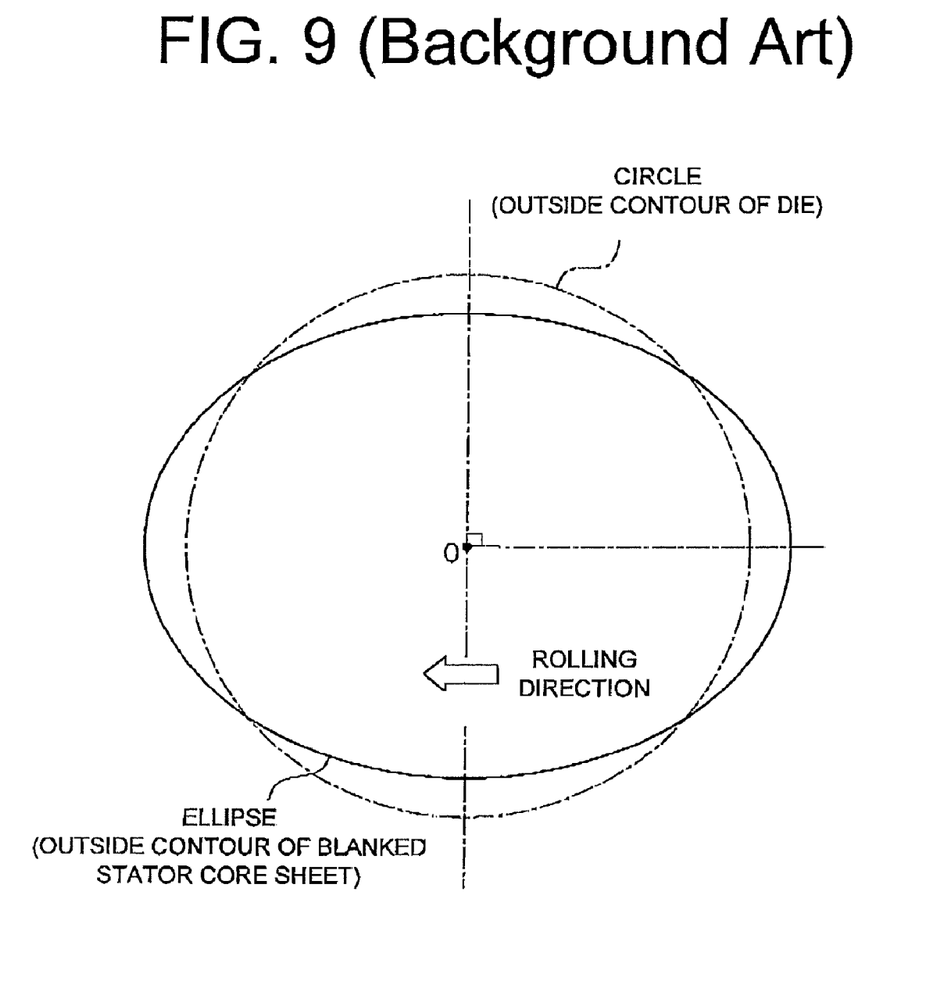
FIG. 9 is an illustrative view showing strain of the stator core sheet.

A stator core sheet 111 blanked from the steel sheet 160 by using a die is strained, as shown in FIG. 9. FIG. 9 shows an outside contour of the die for blanking the stator core sheet 111 from the steel sheet 160 and an outside contour of the blanked stator core sheet 111. While the outside contour of the die is circular, the outside contour of the blanked stator core sheet 111 is elliptical. That is, the outside contour of the stator core sheet 111 cut by a circular blanking die is elliptical. More specifically, the stator core sheet 111 may be formed such that its outside diameter is increased in the rolling direction of the steel sheet 160 and decreased in the direction perpendicular to the rolling direction. Alternatively, the stator core sheet 111 may be formed such that its outside diameter is decreased in the rolling direction of the steel sheet 160 and increased in the direction perpendicular to the rolling direction.

Because the strain of the stator core sheets 111 blanked off from the electromagnetic steel sheet 160 varies from one production lot to another, it is necessary for a manufacturer of the stator core 110 to control the dimension of the outside diameter of the stator core sheets 111. Therefore, it is necessary for the manufacturer to make adjustment of dies for minimizing the number of stator core sheets falling outside the tolerance and for ensuring the process capability.

The outer circumferential surface of the housing 150 may have a flat portion formed by planing, on which a sensor is mounted. However, fixing the stator 100 in the housing 150 with the outer circumferential surface of the stator core 110 strained, the flatness of the flat portion deteriorates. If the sensor is mounted on such a deteriorated flat portion, the sensor may not function properly due to poor sensitivity. In order to avoid such problem, the stator 100 is firstly fixed in the housing 150 and then any appropriate provision is made to prevent foreign matters from entering into the housing 150 before performing the planing for the flat mounting portion for the sensor.

Figure 10:
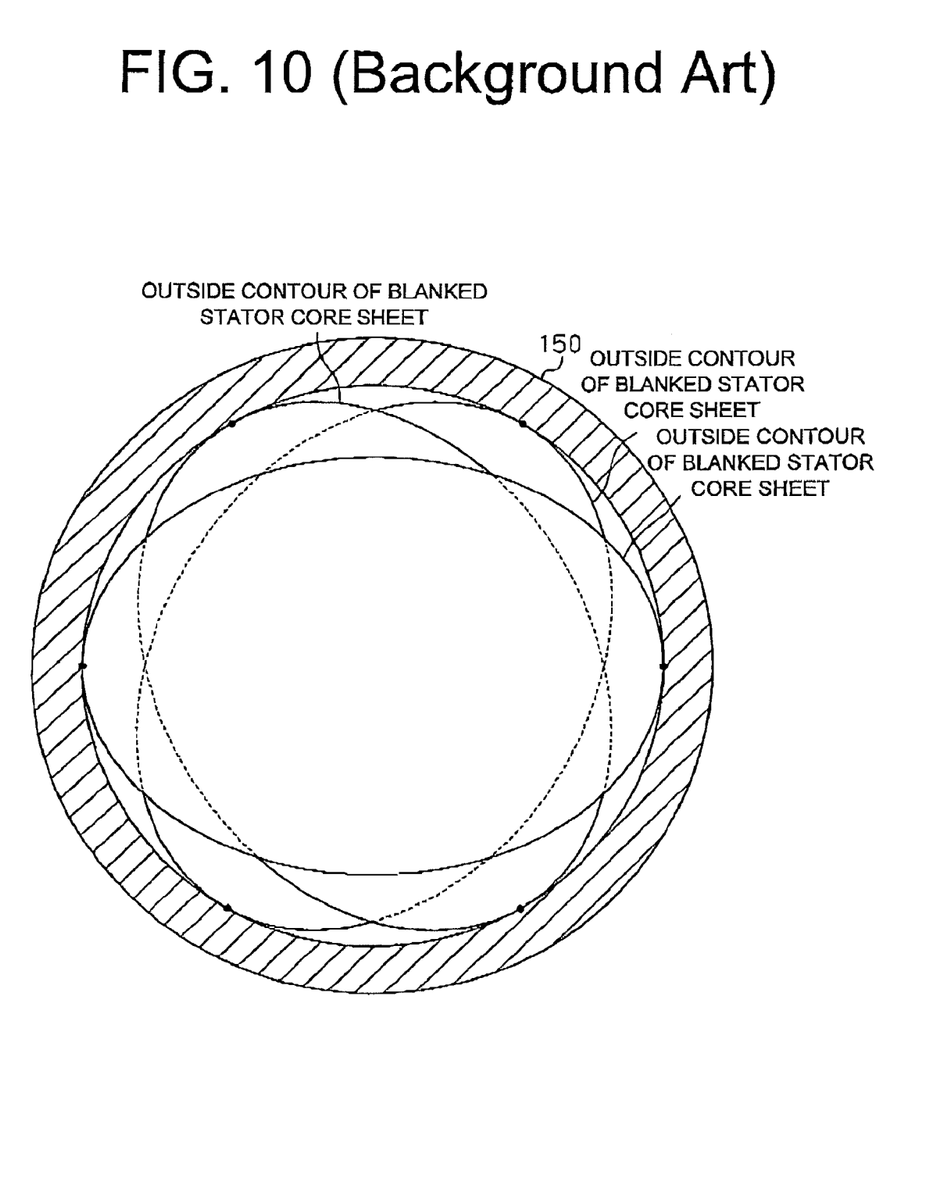
FIG. 10 is a schematic cross sectional view showing stator core sheets laminated in the housing.

Referring to FIGS. 6 and 10, the strained stator core sheets each having 18 slots are turned for each 60 degrees in laminating such sheets one another thereby to form a laminated stator core. If such a stator core 110 is fixed in the housing 150 by shrink fit, the contact area between the inner circumferential surface of the housing 150 and the outer circumferential surface of the stator core 110 is smaller than that in the case where the axial contour of the stator core 110 is a true circle. As a result, there is fear that the stator 100 is rotated because the fixation of the stator 100 to the housing 150 fails to resist the torque of the motor operating under a high load.

The present invention is directed to a method of fixing a stator core in a housing without being influenced by the strain of stator core sheets and with little deformation to the housing after assembling. In addition, the present invention is directed to an electric compressor with a motor using the method.

SUMMARY OF THE INVENTION

The present invention provides a method of fixing a stator core in a cylindrical housing. The method includes the following steps. The first step is a step of blanking a plurality of stator core sheets from an electromagnetic steel sheet by using a die. The die has a circular outside contour for blanking the stator core sheets from the electromagnetic steel sheet and each of the blanked stator core sheets has an outside contour. The second step is a step of forming the stator core by laminating the blanked stator core sheets one on another. The third step is a step of setting a non-fixing position of the stator core to the housing in such an angular position where difference in diametral dimension of the outside contour between the die and the stator core is relatively large.

The present invention also provides an electric compressor having therein a compression mechanism. The electric compressor includes a cylindrical motor housing and an annular stator core. The stator core is fixed in the motor housing with at least a part of an outer circumferential surface of the stator core in contact with inner projections of the motor housing. The stator core is formed of a plurality of stator core sheets laminated one on another. Each of the stator core sheets is blanked off from an electromagnetic steel sheet by using a die. The die has a circular outside contour for blanking the stator core sheets from the electromagnetic steel sheet and each of the blanked stator core sheets has an outside contour. A non-fixing position of the stator core to the motor housing is set between the inner projections in such an angular position where difference in diametral dimension of the outside contour between the die and the stator core is relatively large.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 11:
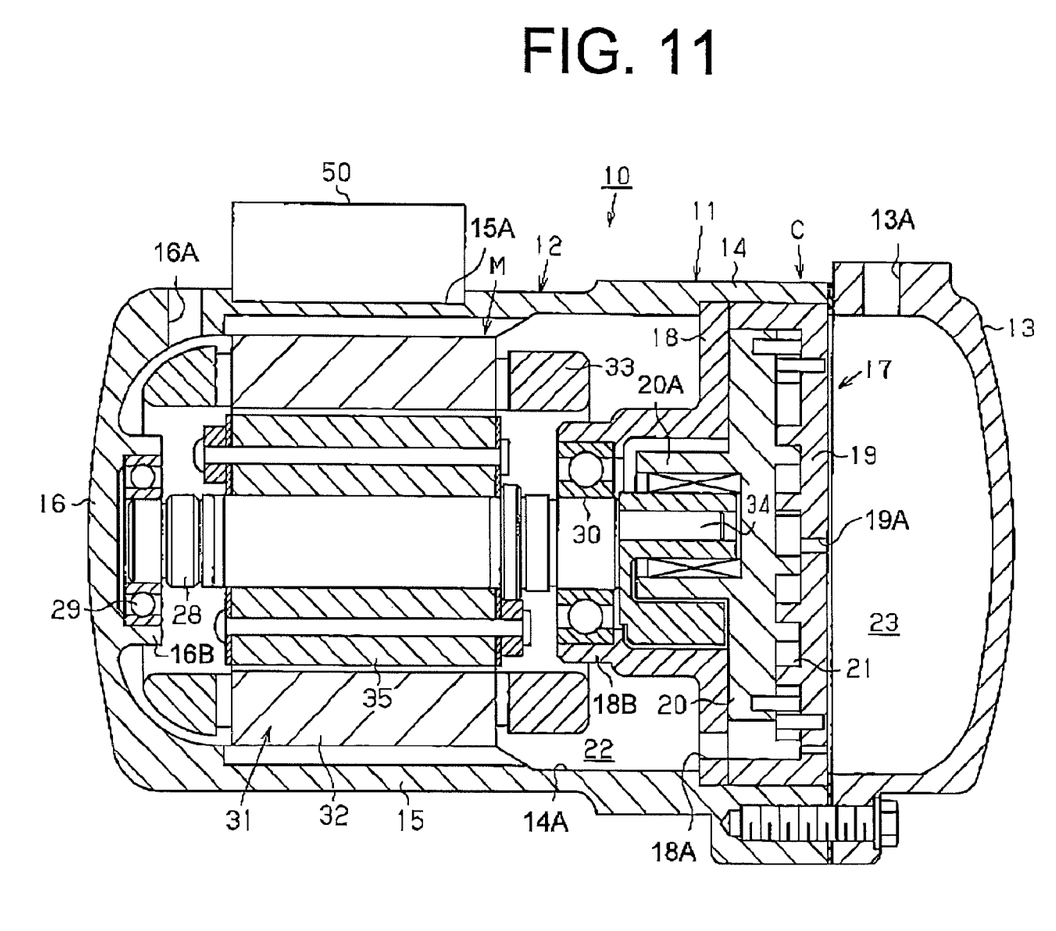
FIG. 11 is a cross sectional view showing a hermetic electric compressor with a motor having a stator fixed to a housing of the compressor according to a preferred embodiment of the present invention.

The following will describe a method of fixing a stator core in a housing of a hermetic electric compressor according to a preferred embodiment of the present invention with reference to the accompanying drawings. Such an electric compressor has therein a compression mechanism. Firstly, the structure of the electric compressor will be explained. It is noted that the right-hand side and the left-hand side of the electric compressor as viewed in FIG. 11 correspond to the front and rear of the electric compressor, respectively. As shown in FIG. 11, the electric compressor 10 includes a closed housing assembly 11. This housing assembly 11 includes a cylindrical main housing 12 with its rear end closed and a front housing 13 which is fixedly joined to the front end of the main housing 12. This main housing 12 is made, for example, of forged aluminum. The main housing 12 includes a compressor housing portion 14, a motor housing portion 15 formed integrally with the compressor housing portion 14, and a rear housing portion 16 formed integrally with the motor housing portion 15. The motor housing portion 15 will be referred to as a motor housing 15 hereinafter.

The compressor housing portion 14 has therein a scroll-type compression mechanism 17. This compression mechanism 17 includes a base plate 18, a fixed scroll member 19 located in the front of the base plate 18, and a movable scroll member 20 provided between the base plate 18 and the fixed scroll member 19. The base plate 18 and the fixed scroll member 19 are fixedly fitted in the compressor housing portion 14 at a stepped part of the inner circumferential surface 14A thereof. The fixed scroll member 19 and the movable scroll member 20 cooperate to form therebetween compression chambers 21. The compressor housing portion 14 has therein a suction chamber 22 located behind the base plate 18. Refrigerant gas in the suction chamber 22 is drawn into the compression chamber 21 through a suction port 18A formed in the base plate 18 for compression in the compression chambers 21. The gas compressed in the compression chambers 21 is discharged to a discharge chamber 23 formed in the front housing 13 through a discharge port 19A formed in the fixed scroll member 19.

The front housing 13 has an outlet port 13A for delivering the compressed refrigerant gas into the external refrigerant circuit of the compressor 10. The rear housing portion 16 has an inlet port 16A for introducing the refrigerant gas from the external refrigerant circuit into the suction chamber 22.

The motor housing 15 of a cylindrical shape has therein an electric motor M including a stator 31 and a rotor 35. The stator 31 is fixedly fitted in the motor housing 15 in tight contact with the inner circumferential surface of the motor housing 15. This stator 31 includes an annular stator core 32 made of iron and stator windings 33 wound and disposed in a plurality of slots 32A (refer to FIG. 1 as described later) formed in the inner circumferential surface of the stator core 32. The stator core 32 is fastened securely to the motor housing 15. The rear housing portion 16 has at the inner rear end thereof a boss 16B having therein a bearing 29. The base plate 18 has at the back thereof a boss 18B having therein a bearing 30. A rotary shaft 28 is rotatably supported by the bearings 29, 30. The rotary shaft 28 is provided at the front end thereof with an eccentric pin 34, which is received by a boss 20A formed at the back of the movable scroll member 20 through a bearing. The rotor 35 is fixedly fitted on the rotary shaft 28. The motor housing 15 has on the outer circumferential surface thereof a flat portion 15A, on which an inverter 50 is mounted.

When an alternating current is applied across the stator windings 33 by a current application mechanism (not shown), the stator 31 and the rotor 35 cause electromagnetic induction to rotate the rotary shaft 28. The rotation of the rotary shaft 28 causes the eccentric pin 34 to revolve about the axis of the rotary shaft 28, so that the movable scroll member 20 revolves about the axis of the rotary shaft 28 without rotating on its own axis. Thus, the compression mechanism 17 compresses refrigerant gas.

Figure 1:
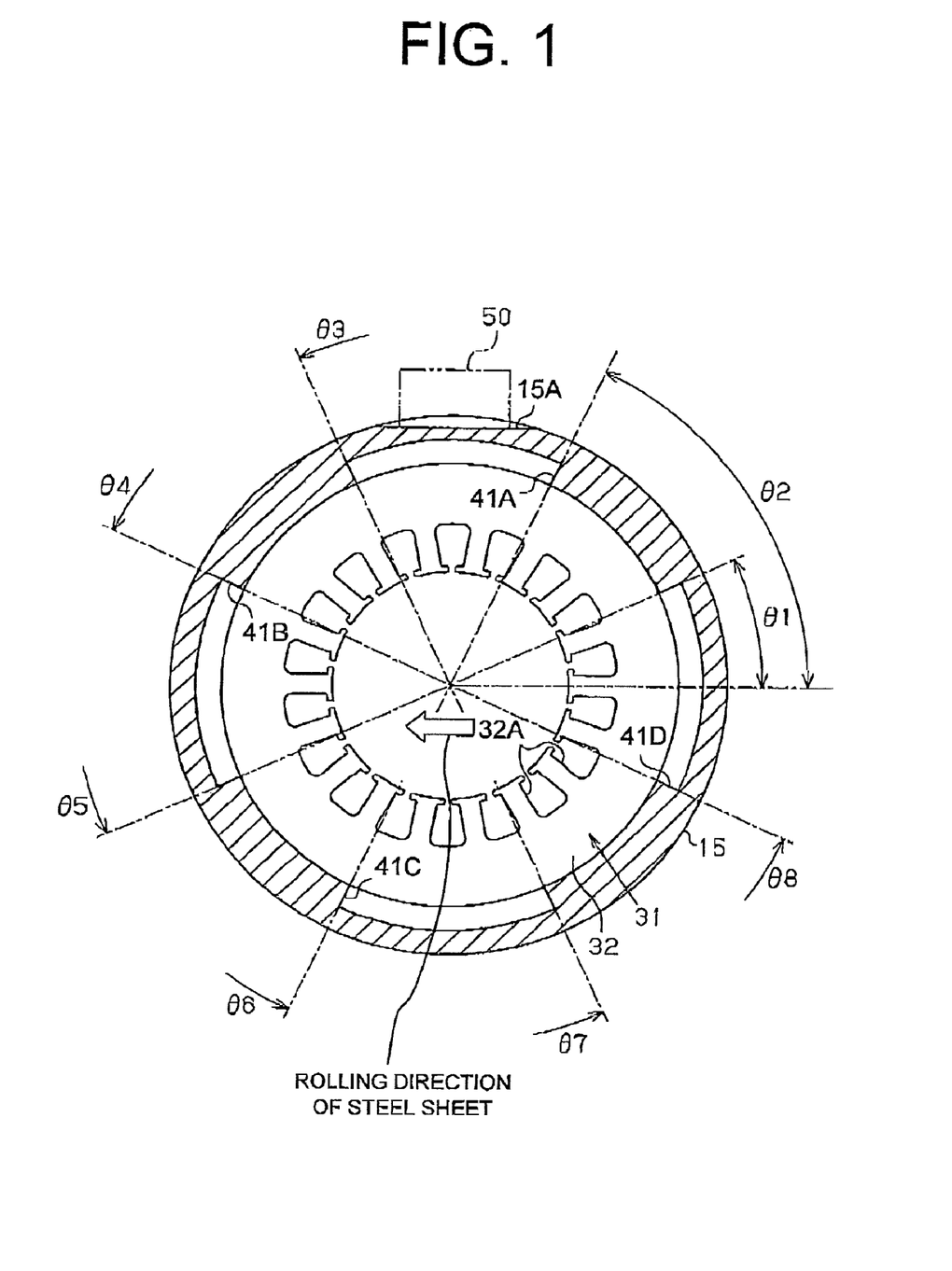
FIG. 1 is a schematic cross sectional view showing a stator fixed to a housing of an electric compressor according to an embodiment of the present invention.
Figure 2:
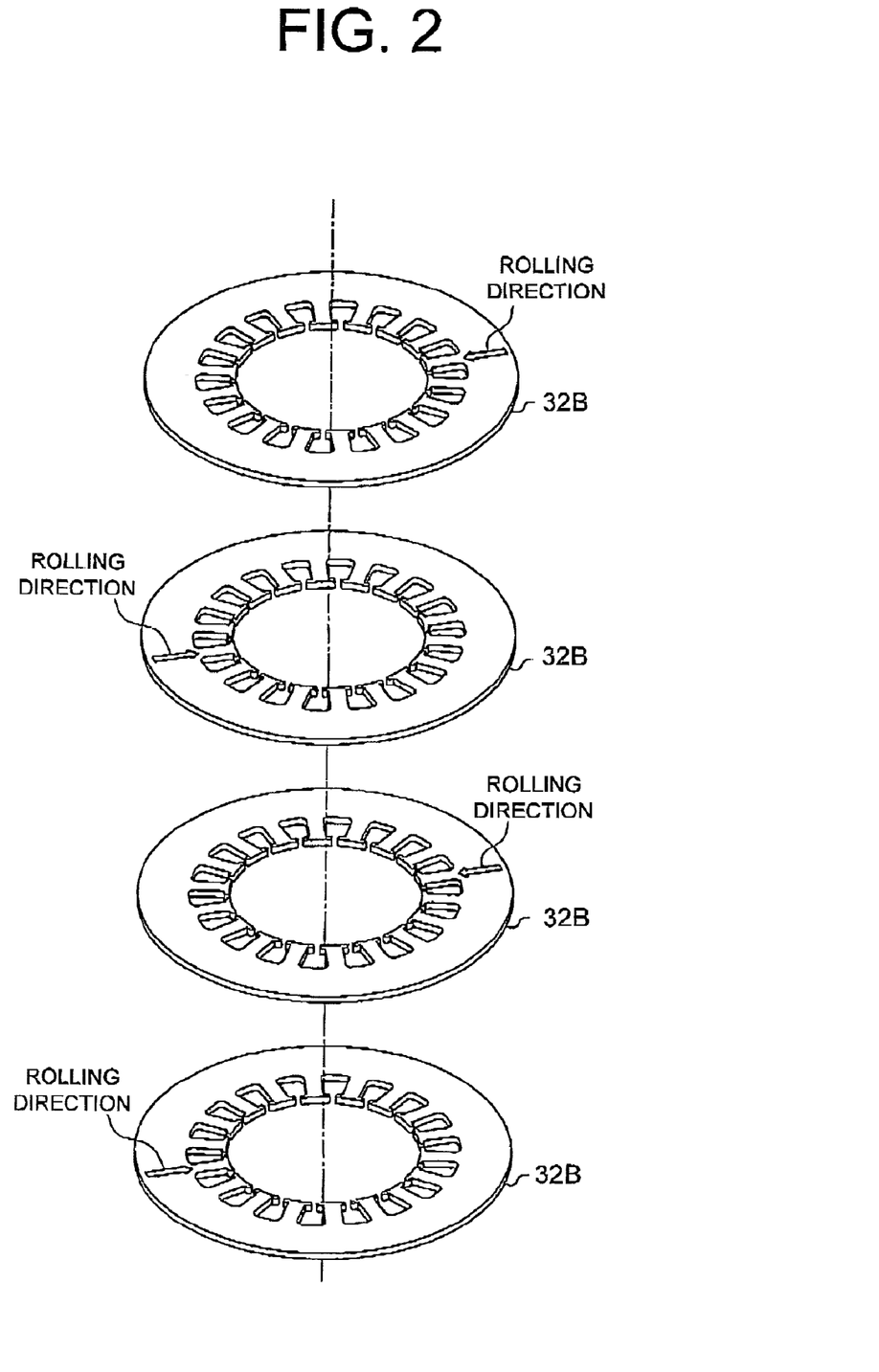
FIG. 2 is an exploded perspective view showing a manner of turning and laminating of stator core sheets for the stator of FIG. 1.

The following will describe more in detail the stator core 32 of the electric compressor 10 of the preferred embodiment according to the present invention. FIG. 1 shows a schematic cross sectional view of the stator core 32 in the motor housing 15. The stator core 32 is formed, as shown in FIG. 2, by laminating a plurality of stator core sheets 32B, each of which is blanked off from an electromagnetic steel sheet 160 (FIG. 7). As already described with reference to FIG. 7, the electromagnetic steel sheet 160 is rolled to the predetermined thickness. The stator core sheets 32B are blanked off from the electromagnetic steel sheet 160 by using a die and laminated one on another thereby to form the laminated stator core 32. The outer circumference of the stator core 32 has a substantially circular shape as viewed in the axial direction of the stator core 32.

Referring to FIG. 1, the stator core 32 has as many as eighteen slots 32A. For the sake of illustration, the stator windings 33 are not shown in FIG. 1.

In laminating the stator core sheets 32B, as shown in FIG. 2, the stator core sheets 32B are alternately turned by an angle of 180 degrees with respect to the rolling direction of the steel sheet 160 from which the stator core sheets 32B are blanked off. That is, each stator core sheet 32B in the laminated stator core 32 is turned 180 degrees from its adjacent stator core sheet 32B with respect to the rolling direction of the steel sheet 160. As already described with reference to FIG. 8, there exists a variation in the thickness of the steel sheet 160 in the direction perpendicular to the rolling direction of the steel sheet 160. However, the above laminating manner makes it possible to laminate the stator core sheets 32B accurately perpendicularly with respect to the end faces of the resulting stator core 32 and also reduce the variation in the height of the stator core 32.

Figure 3:
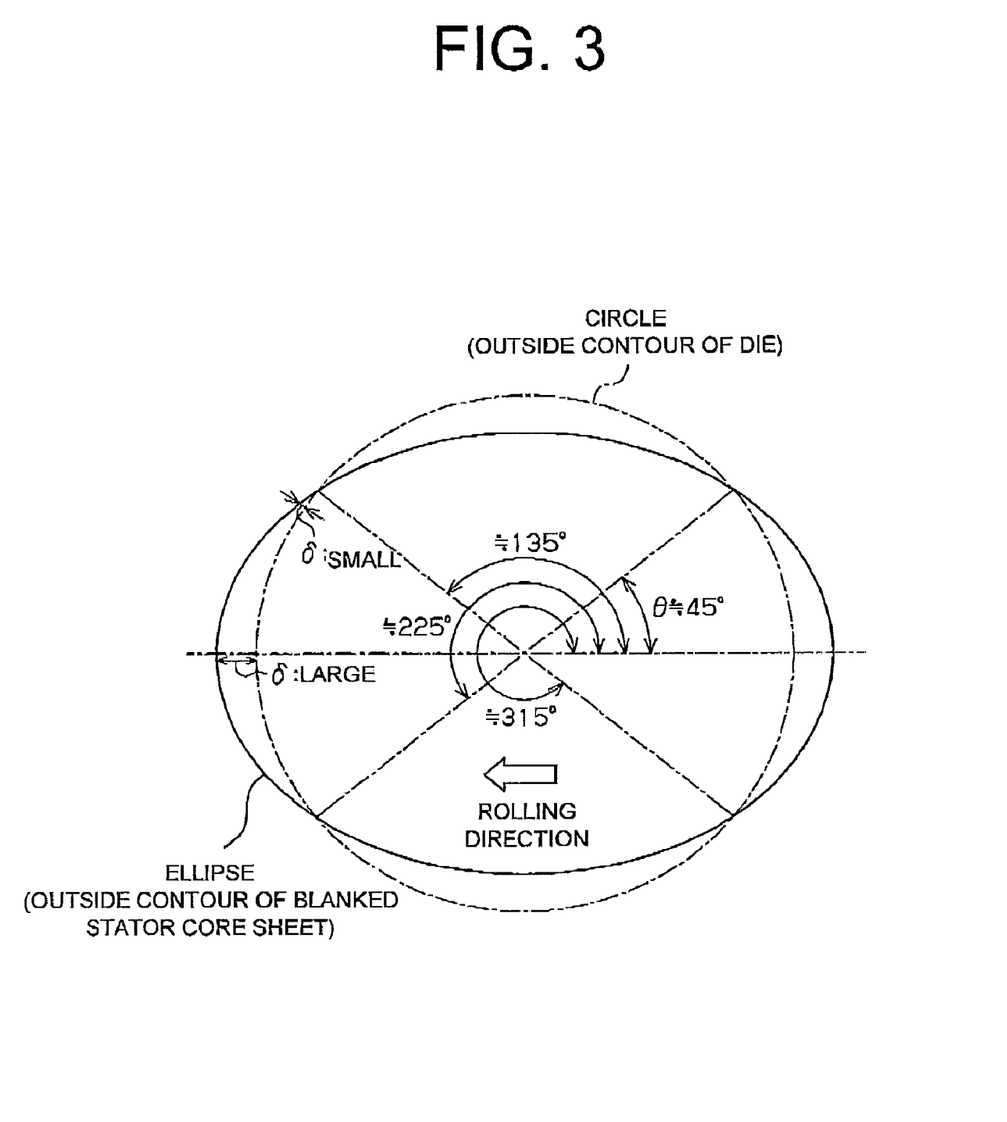
FIG. 3 is an illustrative view showing strain of a stator core sheet.

The laminated structure of the stator core 32 will be further described. The outside contour of the stator core sheet 32B blanked off from the steel sheet 160 by using a circular die or additionally heat treated by annealing thereafter becomes an ellipse or a curve, as shown in FIG. 3. As indicated in FIG. 3, in the present embodiment, the ellipse resulting from the above blanking has its major axis in the rolling direction of the steel sheet 160 and the minor axis in the direction perpendicular to the above rolling direction.

As shown in FIG. 3, the outside contour of the blanked sheet (ellipse) and the outside contour of the blanking die (circle) intersect with each other at angles of about 45, 135, 225 and 315 degrees with respect to the major axis of the ellipse extending along the rolling direction of the steel sheet 160. Therefore, difference δ (variation) in radius between the circle of the blanking die and the ellipse of the blanked stator core sheet 32B are smallest at the angular positions θ of about 45, 135, 225 and 315 degrees of the stator core sheet 32B.

Figure 4:
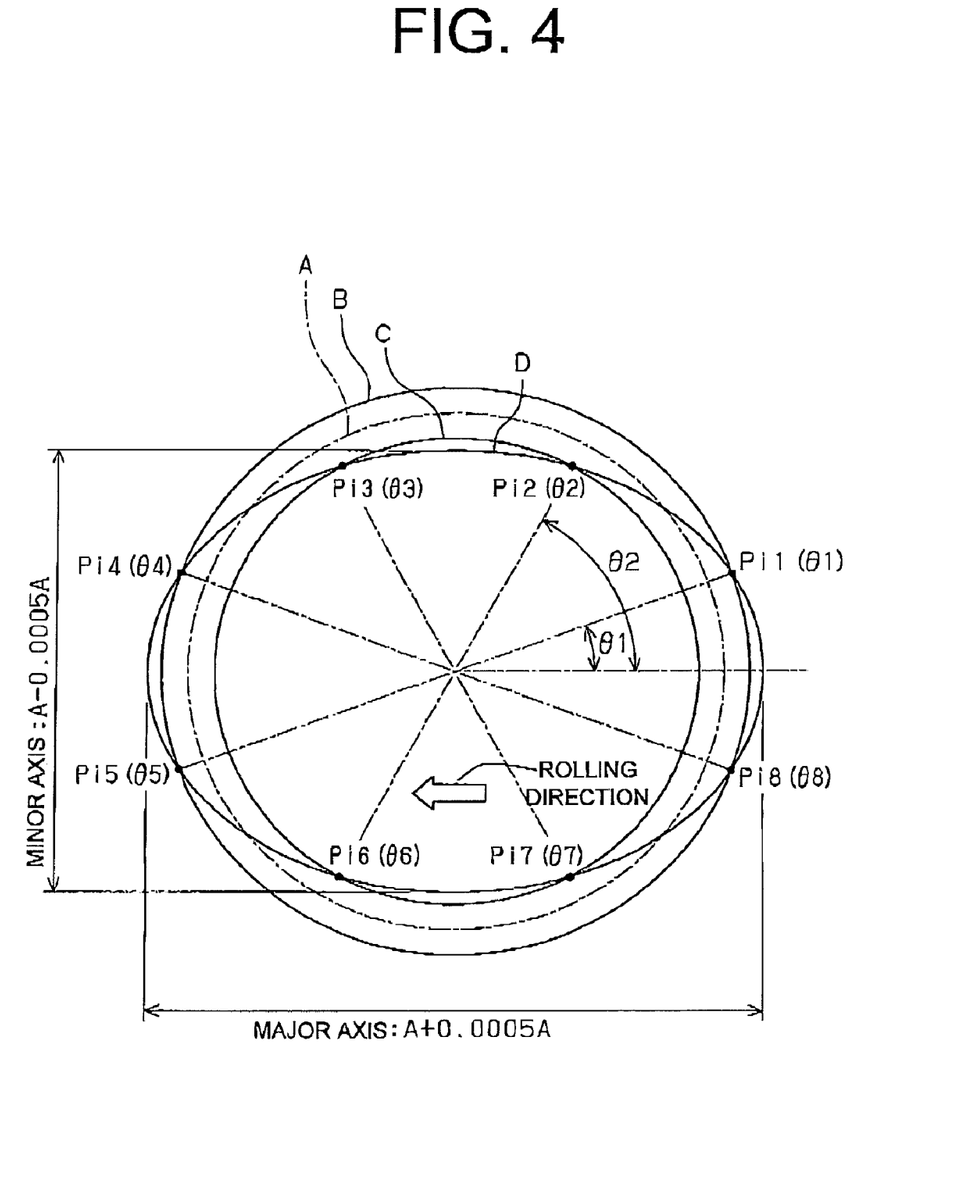
FIG. 4 is a view illustrating the boundaries between fixing positions and non-fixing positions according to the present invention.

Thus, the stator core sheet 32B is subjected to very little or only a negligible influence of straining at the angular positions thereof about 45, 135, 225 and 315 degrees with respect to the major axis of the ellipse extending along the rolling direction. FIG. 4 shows tolerance in diametral dimension of the stator core sheet of FIG. 3.

Referring to FIG. 4, the chain line A shows the contour of a stator core sheet whose diameter is at the middle of the tolerance and which forms a circle with a diameter of A mm. The solid line B shows the contour of a stator core sheet whose diameter is at the upper tolerance and which forms a circle with a diameter of A+a mm. The solid line C shows the contour of a stator core sheet whose diameter is at the lower tolerance and which forms a circle with a diameter of A−a mm. Thus, the solid lines B and C show the circles representing the contour of the blanking dies with the upper and lower tolerances in diameter, respectively.

The solid line D shows an elliptical contour of a blanked stator core sheet 32B. In blanking the stator core sheets 32B from an electromagnetic steel sheet 160 with a common thickness of 0.35 mm by using a circular die, strain occurs in the steel sheet 160 in the rolling direction thereof, which is about 0.05% of the diameter of the blanked stator core sheets 32B. Strain also occurs in the direction perpendicular to the rolling direction, which is also about 0.05% of the diameter of the blanked sheets 32B. When a strain of 0.05% occurs in the stator core sheet with a diameter of A mm, the diameter of the sheet as measured in the rolling direction becomes A+0.0005 A mm and the diameter of the same sheet in the direction perpendicular to the rolling direction becomes A−0.0005 A mm. Therefore, the length of the major axis of the ellipse shown by the solid line D of FIG. 4 in the rolling direction is A+0.0005 A mm and the length of the minor axis of the same ellipse in the direction perpendicular to the rolling direction is A−0.0005 A mm. The center of the ellipse shown by the solid line D coincides with the center of the circle shown by the chain line A. In the present embodiment, the length of 0.0005 A is larger than that of a.

Thus, FIG. 4 shows the stator core sheets having a diameter of A mm within the diametral tolerance of ±a mm and a strain of 0.05%. The circle shown by the solid line B and the ellipse shown by the solid line D have in common the intersection points Pi1, Pi4, Pi5 and Pi8. The circle shown by the solid line C and the ellipse shown by the solid line D have in common the intersection points Pi2, Pi3, Pi6 and Pi7. The intersection points Pi1, Pi2, Pi3, Pi4, Pi5, Pi6, Pi7 and Pi8 are located at angular positions of θ1, θ2, θ3, θ4, θ5, θ6, θ7 and θ8 with respect to the major axis of the ellipse along the rolling direction, respectively. It is noted that each of FIGS. 3 and 4 shows the elliptical sheet for the stator core sheet 32B in an exaggerated manner for the sake of understanding of the present invention.

With the above elliptical shape taken into consideration, the motor housing 15 of FIG. 1 has on the inner surface thereof projections 41A, 41B, 41C and 41D for fixing the stator core 32 in the motor housing 15. The projections 41A, 41B, 41C and 41D are in contact at the distal end faces thereof with the outer circumferential surface of the stator core 32. That is, the stator core 32 is fixed in the motor housing 15 with at least a part of the outer circumferential surface of the stator core 32 in contact with the inner surface of the motor housing 15.

The radial sides of the projections 41A, 41B, 41C and 41D are determined as follows. Referring to FIGS. 1 and 4, the first projection 41A is located such that its opposite radial sides form angles of θ1, θ2 with the major axis of the ellipse D. Similarly, the second projection 41B is located such that its opposite radial sides form angles of θ3, θ4 with the major axis of the ellipse D. The third projection 41C is located such that its opposite radial sides form angles of θ5, θ6 with the major axis of the ellipse D. The fourth projection 41D is located such that its opposite radial sides form angles of θ7, θ8 with the major axis of the ellipse D.

Thus, the stator core 32 is fixed in the motor housing 15 in such an angular position where the difference δ in the diametral dimension of the outside contour between the blanking die and the blanked stator core sheet 32B is relatively small. For this purpose, the ranges of the fixing positions are set between θ1, θ2, between θ3, θ4, between θ5, θ6, and between θ7, θ8 with respect to the major axis of the ellipse D. On the other hand, the stator core 32 is not fixed in the motor housing 15 in such an angular position where the difference δ in the diametral dimension of the outside contour between the blanking die and the blanked stator core sheet 32B is relatively large. For this purpose, the ranges of the non-fixing positions are set between θ8, θ1, between θ4, θ5, between θ2, θ3, and between θ6, θ7 with respect to the major axis of the ellipse D.

Thus, the fixed ranges ($\theta1 \leq \theta \leq \theta2$, $\theta3 \leq \theta \leq \theta4$, $\theta5 \leq \theta \leq \theta6$, $\theta7 \leq \theta \leq \theta8$) change depending on allowable tolerance of the outside diameter of the stator core 32. The intersection points can be found from simultaneous equations of the circles B, C and the ellipse D of FIG. 4 and the information of such intersection points can be utilized in designing the projections on the inner surface of the motor housing 15. That is, the intersection points Pi1-Pi8 in FIG. 4 are the boundaries between the fixing positions and the non-fixing positions in fixing the stator core 32 to the motor housing 15.

Because the strain of the stator core sheets blanked off from the electromagnetic steel sheet 160 varies from one production lot to another, it is necessary for a manufacturer of the stator core 110 to control the diametral dimension of the stator core sheet 111. Therefore, it is necessary for the manufacturer to make adjustment of dies for minimizing the number of stator core sheets failing outside the tolerance and for ensuring the process capability. According to the present embodiment, however, regardless of the strain varying from one production lot to another, the stator core 32 is fixed in the motor housing 15 in such an angular position where the difference δ in the diametral dimension of the outside contour between the blanking die and the blanked stator core sheet 32B is relatively small. By so doing, the stator core 32 can be fixed securely to the motor housing 15 without being influenced by the strain of the stator core sheets 32B. Thus, it is unnecessary to adjust the die for controlling the diametral dimension of the outside contour of the stator core sheets.

Referring to FIG. 1, the outer circumferential surface of the motor housing 15 has a flat portion 15A formed by planing, on which the inverter 50 is mounted. In this case, if the stator core 32 has strain in its outer circumferential surface, the flatness of the flat portion 15A is not deteriorated in fixing the stator 31 in the motor housing 15. That is, although the inverter 50 mounted on the flat portion 15A whose flatness has been deteriorated may fail to be fixed to the flat portion 15A, such problem can be prevented in the present embodiment. Therefore, it is unnecessary to plane the motor housing 15 after making appropriate provision to prevent foreign matters from entering into the motor housing 15 after the stator 31 has been fixed in the motor housing 15. That is, according to the above-described method of the embodiment, deformation of the motor housing 15 after assembling of the compressor 10 is reduced without affecting the flatness of the flat portion 15A on the motor housing 15 for mounting of the inverter 50. Therefore, planing the motor housing 15 after the stator 31 has been fixed in the motor housing 15 is not necessary.

Referring again to FIGS. 6 and 10, the stator core sheets each having 18 slots are turned for each 60 degrees in stacking such sheets one on another thereby to form a laminated stator core 110. If such a stator core 110 is fixed in the housing 150 by shrink fit, the contact area between the inner surface of the housing 150 and the outer circumferential surface of the stator core 110 is smaller than that in the case where the axial contour of the stator core 110 is a true circle. As a result, there is fear that the stator 100 is rotated because the fixation of the stator 100 to the housing 150 fails to resist the torque of the motor operating under a high load. According to the present embodiment, however, regardless of the strain varying from one production lot to another, the stator core 32 is fixed in the motor housing 15 in such an angular position where the difference δ in the diametral dimension of the outside contour between the blanking die and the blanked stator core sheet 32B is relatively small. In laminating the stator core sheets 32B, the stator core sheets 32B are alternately turned by an angle of 180 degrees with respect to the rolling direction of the steel sheet 160 from which the stator core sheets 32B are blanked off. By so doing, the contact area between the inner surface of the motor housing 15 and the outer circumferential surface of the stator core 32 is large enough to resist the torque of the motor operating under a high load.

The above-described embodiment has the following advantageous effects.

(1) Method of fixing the stator core 32 in the motor housing 15 with a part of the outer circumferential surface of the stator core 32 in contact with the inner surface of the motor housing 15 has been described with reference to FIGS. 1 and 3. According to this method, the ranges of the fixing positions of the stator core 32 are set in such angular positions ($\theta 1 \leq \theta \leq \theta 2$, $\theta 3 \leq \theta \leq \theta 4$, $\theta 5 \leq \theta \leq \theta 6$, $\theta 7 \leq \theta \leq \theta 8$) where the difference δ in the diametral dimension of the outside contour between the blanking die and the stator core 32 is relatively small. The ranges of the non-fixing positions of the stator core 32 are set in such angular positions ($\theta 8 < \theta < \theta 1$, $\theta 4 < \theta < \theta 5$) where the diametral dimension of the outside contour of the stator core 32 is larger than that of the blanking die and also where the difference δ in the diametral dimension of the outside contour between the blanking die and the stator core 32 is relatively large. Thus, the invention provides a method according to which fixing of the stator core 32 in the motor housing 15 is accomplished regardless of the strain of the stator core sheets 32B and with little deformation of the motor housing 15 after assembling of the electric compressor 10. The method according to the present invention is advantageous also in that poor mounting of the inverter 50 on the motor housing 15 can be prevented.

(2) As already described with reference to FIGS. 1 and 4, the circle (shown by the solid line B in FIG. 4) whose diameter is at the upper tolerance of the outside contour of a blanking die and the ellipse of the outside contour of a blanked stator core sheet 32B (shown by the solid line D in FIG. 4) have in common intersection points Pi1, Pi4, Pi5, and Pi8. By determining the boundaries between the fixing positions and the non-fixing positions from these intersection points Pi1, Pi4, Pi5, and Pi8, the electric compressor 10 may be designed with the diametral tolerance of the stator core sheets taken into consideration.

(3) As already described with reference to FIGS. 1 and 4, the intersection points can be found from simultaneous equations of the circles B, C and the ellipse D of FIG. 4 and the information of such intersection points can be utilized in designing the projections on the inner surface of the motor housing 15. Therefore, it becomes easier to control the dimensional tolerance of the fixing positions of the motor housing 15 in designing the motor housing 15.

(4) As already described with reference to FIGS. 1 and 3, the ranges of the non-fixing positions of the stator core 32 are set in such angular positions ($\theta 2 < \theta < \theta 3$, $\theta 6 < \theta < \theta 7$) where the difference δ in the diametral dimension of the outside contour between the blanking die and the stator core 32 is relatively large and also where the fixing of the stator core 32 is not affected. Because the radial thickness of the closed housing 11 is reduced in the non-fixing positions, the weight of the housing 11 is reduced and the manufacturing cost is reduced, accordingly. When the motor having the stator 31 is used in the hermetic electric compressor 10, the inverter 50 is arranged on the outer circumferential surface of the motor housing 15 at a non-fixing position between the stator core fixing projections 41A and 41B. Therefore, during the operation of the compressor 10, refrigerant gas flowing from the inlet port 16A and introduced into the suction chamber 22 is allowed to pass through the space between the projections 41A and 41B. This helps to cool the inverter 50 efficiently.

The present invention is not limited to the above-described embodiment, but it may be practiced as exemplified below.

Figure 5:
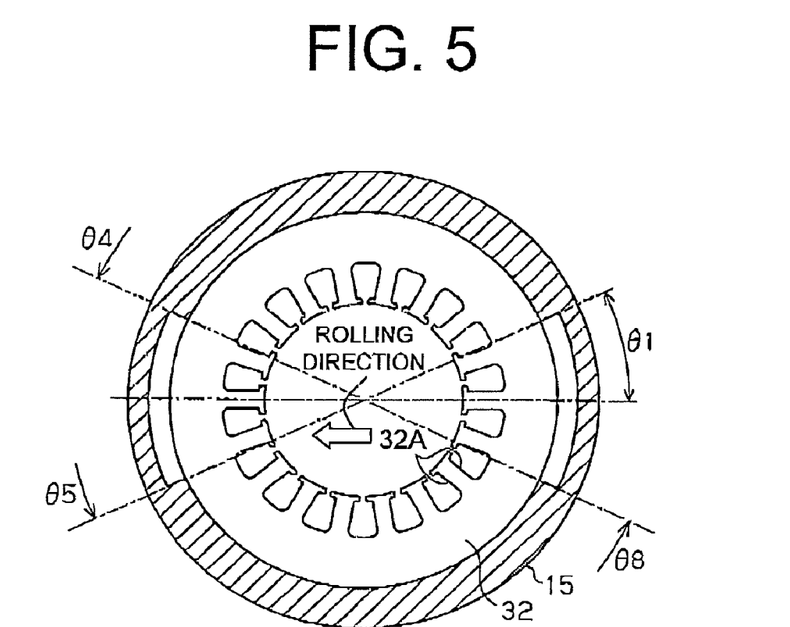
FIG. 5 is a schematic cross sectional view showing a stator fixed to a housing according to another embodiment of the present invention.

The strain of the blanked stator core sheet 32B in the rolling direction is responsible for the deformation of the motor housing 15. In view of the above strain, the range of fixing the stator core 32 in the motor housing 15 may be set in angular positions between θ1, θ4, and between θ5, θ8 with respect to the rolling direction, as shown in FIG. 5. In this case, the strained portion of the blanked stator core sheet 32B in the rolling direction may be unused in fixing to the motor housing 15.

The above embodiment has been described for a case where the number of slots 32A of the stator core 32 is 18. However, the number of slots 32A is not limited to 18, but the stator core sheet may have any number of slots.

Therefore, the present examples and embodiments are to be considered as illustrative and not restrictive, and the invention is not to be limited to the details given herein but may be modified within the scope of the appended claims.

What is claimed is:

1. A method of fixing a stator core in a cylindrical housing, the method comprising the steps of:
    blanking a plurality of stator core sheets from an electromagnetic steel sheet by using a die, wherein the die has a circular outside contour for blanking the stator core sheets from the electromagnetic steel sheet and each of the blanked stator core sheets has an outside contour;
    forming the stator core by laminating the blanked stator core sheets one on another; and
    setting a non-fixing position of the stator core to the cylindrical housing in such an angular position where difference in diametral dimension of the outside contour between the die and the stator core is relatively large.

2. The method according to claim 1, further comprising the step of:
    setting a fixing position of the stator core to the cylindrical housing in such an angular position where the difference in the diametral dimension of the outside contour between the die and the stator core is relatively small.

3. The method according to claim 2, further comprising the step of:
    determining boundary between the fixing position and the non-fixing position from intersection points between a circle whose diameter is at an upper tolerance of the circular outside contour of the die and a curve of the outside contour of the stator core.

4. The method according to claim 2, further comprising the step of:
    determining boundary between the fixing position and the non-fixing position from points where a curve of the outside contour of the stator core intersects with a circle whose diameter is at an upper tolerance of the circular outside contour of the die and a circle whose diameter is at a lower tolerance of the circular outside contour of the die, respectively.

5. The method according to claim 1, wherein the electromagnetic steel sheet is a rolled sheet, wherein the stator core is formed by turning the stator core sheets from the adjacent stator core sheets thereof by an angle of 180 degrees with respect to rolling direction of the steel sheet in laminating the stator core sheets.

6. An electric compressor having therein a compression mechanism, comprising:
    a cylindrical motor housing; and
    an annular stator core fixed in the motor housing with at least a part of an outer circumferential surface of the stator core in contact with inner projections of the motor housing, wherein the stator core is formed of a plurality of stator core sheets laminated one on another, wherein each of the stator core sheets is blanked off from an electromagnetic steel sheet by using a die, wherein the die has a circular outside contour for blanking the stator core sheets from the electromagnetic steel sheet and each of the blanked stator core sheets has an outside contour, wherein a non-fixing position of the stator core to the motor housing is set between the inner projections in such an angular position where difference in diametral dimension of the outside contour between the die and the stator core is relatively large.

7. The electric compressor according to claim 6, wherein the inner projection at a fixing position of the stator core to the motor housing is set in such an angular position where the difference in the diametral dimension of the outside contour between the die and the stator core is relatively small.

8. The electric compressor according to claim 7, wherein a circle whose diameter is at an upper tolerance of the circular outside contour of the die and a curve of the outside contour of the stator core have intersection points, from which boundary between the fixing position and the non-fixing position is determined.

9. The electric compressor according to claim 7, wherein a curve of the outside contour of the stator core intersects with a circle whose diameter is at an upper tolerance of the circular outside contour of the die and a circle whose diameter is at a lower tolerance of the circular outside contour of the die, respectively, at points from which boundary between the fixing position and the non-fixing position is determined.

10. The electric compressor according to claim 6, wherein the electromagnetic steel sheet is a rolled sheet, wherein the stator core sheets are turned from the adjacent stator core sheets thereof by an angle of 180 degrees with respect to rolling direction of the steel sheet in laminating the stator core sheets.

* * * * *